Nov. 8, 1932.  P. KAPITZA ET AL  1,886,692
POWER TRANSMISSION MEANS
Filed May 22, 1929
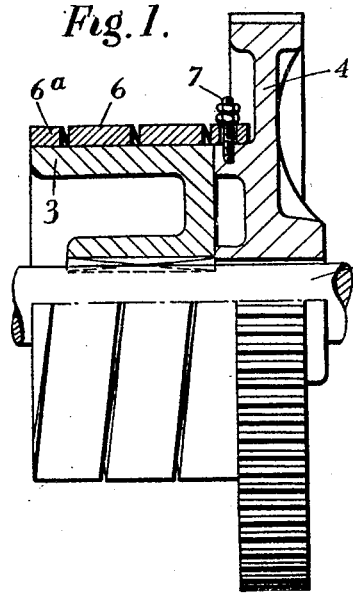
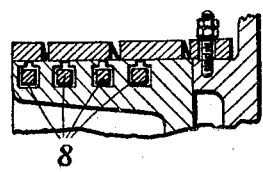
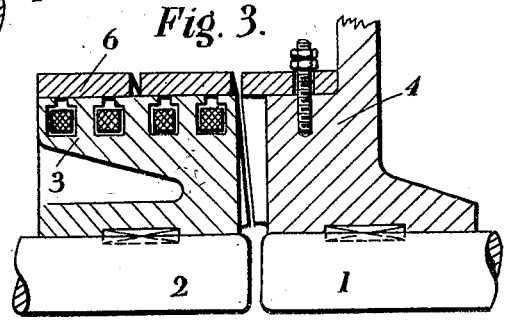
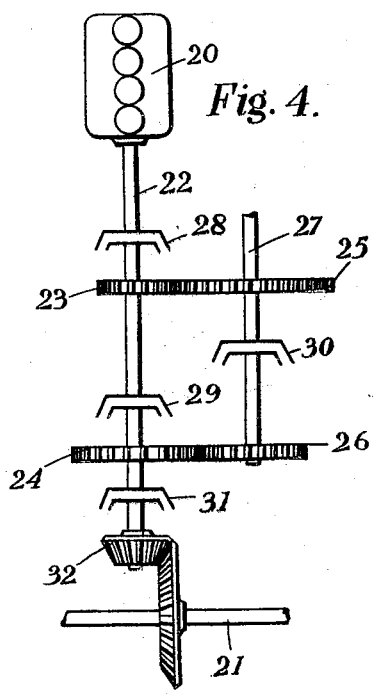
INVENTORS
P. KAPITZA
G. V. LOMONOSSOFF
BY
ATTORNEY Patented Nov. 8, 1932

1,886,692

UNITED STATES PATENT OFFICE

PIERRE KAPITZA AND GEORGE VOLDEMAR LOMONOSSOFF, OF CAMBRIDGE, ENGLAND

POWER TRANSMISSION MEANS

Application filed May 22, 1929, Serial No. 365,190, and in Great Britain May 25, 1928.

In connection with the use of internal combustion engines transmitting power through the intermediary of a clutch, and more particularly in connection with locomotive engines for hauling heavy loads, it is commonly found for example on starting or changing gear that although the two elements of the clutch may be capable of transmitting an even torque during the time that they are rotating at different speeds, yet ultimately a point is reached when the two clutch elements seize with each other so that the whole torque of the engine is suddenly transmitted to the road wheels with sufficient shock or jerk as to be liable to cause breakdown. This arises from the fact that static friction and dynamic friction have different values between the same surfaces.

Further, in changing gear, it is usually necessary that the driving torque of the engine be removed from the road wheels for a substantial period of time, which in the case of heavy locomotives may reach as much as 20 seconds. If a heavy and long train is being hauled, of which the after part is still moving up a sharp gradient while the forward part is moving downhill or on the level at the time the gear is changed, this long interval during which the tractive force is not being applied to the train, may cause the latter to slow down to such an extent that when the tractive force is reapplied there is risk of fracture of a coupling.

The present invention accordingly has for its object in the first place to provide a clutch or transmission coupling in which the power transmitted is practically independent of the coefficient of friction between the engaging surfaces. By this means, the shock or jerk already referred to when the two engaging surfaces of the clutch seize is largely avoided, as relative movement is possible between the engaging surfaces down to a very small value which is practically indistinguishable from zero.

With such a clutch, it is further possible to utilize "slip" in such a manner that the clutch members are never entirely separated, so that some tractive force is always being transmitted by the clutch, the minimum amount of torque so transmitted not falling below a predetermined value according to the design and arrangement of the parts of the clutch.

The invention thus further comprises apparatus for transmitting power in which means is provided for varying the speed ratios without entirely relieving the driven member from the torque of the driving member.

It is an essential characteristic of the invention to provide a cylindrical member on one shaft and a spiral spring on the other shaft capable of seizing said member, the coils of the spring being arranged in such a direction, however, that the normal over-running of the driven by the driving drum tends to uncoil the spiral and expand the band so as to release its grip on the second drum. By this means, the jerky action of an ordinary spiral coil one-way clutch is eliminated, the spring band of the present invention being caused to engage the drum by a specially provided instrumentality, such as electro-magnetic coils, the operation of which can be controlled as desired. It will be shown later that within ordinary limits, the action of such a clutch is practically independent of the coefficient of friction between the spring and cylindrical member so that the clutch operates faithfully in accordance with the variations of its control mechanism.

A clutch according to the present invention may be constructed as follows:—

The aligned and adjacent ends of the driving and driven shafts are each fitted with a similar drum, the drums being adapted to be engaged together by an expansible band formed of spirally-coiled spring metal, mounted on one drum and extending over the other. The coils of the springs are arranged in such a direction that the normal over-running of the driven by the driving drum tends to uncoil the spiral and expand the band so as to release its grip on the second drum. Against this tendency, however, the spiral band is positively engaged on the second drum (to which it is not permanently mounted) by any suitable means. The engagement may be effected mechanically as by moving the free end of the spiral band radially, or applying a pressure surface on the outside thereof; but we prefer to engage the spiral band on the free drum by electro-magnetic means through the intermediary of coils carried in slots in the surface of its cooperating drum.

We have discovered that with such an arrangement the torque M transmitted is governed by the following equation:—

$$M = pbl^2 (1-e^{-\mu\alpha})$$

where
   $b$ = width of the band
   $p$ = pressure applying the band to the surface
   $l$ = radius of the drum
   $\alpha$ = angle subtended by the spiral coils = $2\pi n$, $n$ being the number of turns.
   $\mu$ = coefficient of friction.

If this equation is plotted with the coordinates M and $\mu$ it will be found that the curve when $n > 2.5$ rises very steeply until $\mu$ reaches 0.2, and thereafter remains at practically constant level. As with most of the materials usable with this form of clutch, the coefficients of friction will be found to lie between .2 and .5, it will be realized that within these workable limits the expression is practically independent of the coefficient of friction. In a given case where the spring possesses three complete turns extending over the free drum, the variation in the expression does not exceed 4 per cent when $\mu$ varies between .2 and .5.

The invention is illustrated in the accompanying drawing in which

Fig. 1 illustrates a clutch formed in accordance with the first modification (hereinafter referred to as non-seizing clutch).

Fig. 2 shows a detail applicable to Fig. 1,

Fig. 3 illustrates a modification of Fig. 1,

Fig. 4 illustrates a transmission mechanism in which both forms of clutch are embodied.

Turning now to the form illustrated in Fig. 1 the shaft 1 carries a drum 3 rigid therewith and normally comprising the driven element. Rotatable on the shaft is a spur wheel 4 comprising the driving element. A band 6 of spring steel lies over the drum normally without contacting with it, the inner end of the band being anchored to the wheel 4 as by means of a bolt 7.

In Fig. 1 the wheel 4 is normally rotated in a counter clockwise direction when viewed from the right hand of the figure. In these circumstances the free end of the band 6 will be directed towards the approaching surface of the drum 3 so that the parts will not naturally seize, any contact or friction between the parts tending to uncoil and expand the band 6 so that they become clear.

Any suitable means not shown in Fig. 1 is provided for frictionally engaging the band 6 with the drum 3 when it is desired to engage the clutch. Such means preferably comprise electro-magnetic coils 8, Fig. 2, held in slots of the periphery of the drum, and adapted to engage the band therewith by electro-magnetic attraction, the amount of which can be definitely controlled by controlling the current passing through the coils.

It will be realized that such an arrangement conforms to the formula given above, and that in accordance with the formula the operation of the clutch will be independent of the coefficient of friction within wide limits.

In Fig. 3 is illustrated a modification employing two shafts 1, 2, the gear wheel 4 being mounted on the one shaft and the drum 3 on the other. The band 6 is engaged with the drum 3 electro-magnetically in a manner similar to that formerly described.

In Fig. 4 is illustrated a transmission gearing in which 20 represents an internal combustion engine, and 21 a driven axle. The shaft 22 driven by the engine carries a pair of gears 23, 24 engaging with a pair of gears 25, 26 carried by a lay shaft to give a different velocity ratio. The shaft 22 is broken between gear 23 and the engine, and again between gears 23, 24 by two clutches 28, 29 of the non-seizing type. A further one-way clutch 30 of any suitable construction breaks the lay shaft 27 between the gears 25, 26, and an ordinary one-way clutch 31 breaks the main shaft 22 between the gears and the driving pinion 32 of the axle 21. The operation of this mechanism is carried on as follows:—

On starting from rest clutches 30, 31 are first engaged. Non-seizing clutch 28 is now gradually engaged, and owing to its special accommodation for slip gradually takes up the drive which proceeding through the gears 25, 26 rotates the axle 21 at considerably less speed than that of shaft 22.

In order to change gear, clutch 30 is disengaged and non-seizing clutch 29 engaged, the latter clutch in similar manner taking up the drive without appreciable shock or jar, and the transmission being direct as far as the pinion 32. Owing to its special construction clutch 29 may be engaged before clutch 30 is disengaged so that the axle shaft is never entirely disconnected from the engine during the operation.

When it is desired to change back to the lower gear, the control mechanism of clutch 30 is positively actuated and non-seizing clutch 29 is disengaged, the clutches both being engaged for a certain period of time so as to maintain the axle shaft under power. As at the moment of the above actuation the element 3 connected to gear wheel 26 is moving much faster than the element 6 connected to gear wheel 25 nothing happens immediately, since the driven member is over-running the driving member.

As, however, the speed of the axle 21 further diminishes and that of the engine is usually speeded up, a point arrives at which the two elements of clutch 30 are at similar speeds; immediately after this moment the one-way clutch 30 automatically engages with sufficient smoothness since the engagement takes place automatically on the occurrence of greater speed in the driving member.

The one-way clutch 31 is optionally provided to prevent the axle 21 from driving the engine and actuating the clutches in the wrong sense when, for example, the train is running downhill. The form of clutch utilizing a self-engaging spring band may be conveniently used at this point. It will be understood of course that instead of the one-way clutch 30, the non-seizing clutch as shown in Fig. 1 may be provided at this point.

We claim:—

1. Friction clutch comprising a coiled spring band of electromagnetic material anchored to a clutch member, a second member with which said band can engage, slots in the surface of said second member, coils in said slots adapted when energized to cause said spring band to move radially towards said member, the direction of relative rotation of the parts when engaging being such as to tend frictionally to move the band radially away from the second member.

2. Friction clutch comprising a coiled spring band of electromagnetic material anchored to a clutch member, a second internal member with which said band can engage by contraction, slots in the surface of said second member, coils in said slots adapted when energized to cause said spring band to contract on said member, the direction of relative rotation of the parts when engaging being such as to tend frictionally to move the band radially away from the second member.

In testimony whereof we affix our signatures.

PIERRE KAPITZA.
GEORGE V. LOMONOSSOFF.